INVENTOR.
ARTHUR H. PITCHFORD.
BY [signature]
his ATTORNEY 3,167,503
PARTICLE SEPARATING APPARATUS
Arthur H. Pitchford, 501 Castle Shannon Blvd.,
Pittsburgh, Pa.
Filed Apr. 28, 1961, Ser. No. 106,325
7 Claims. (Cl. 209—242)

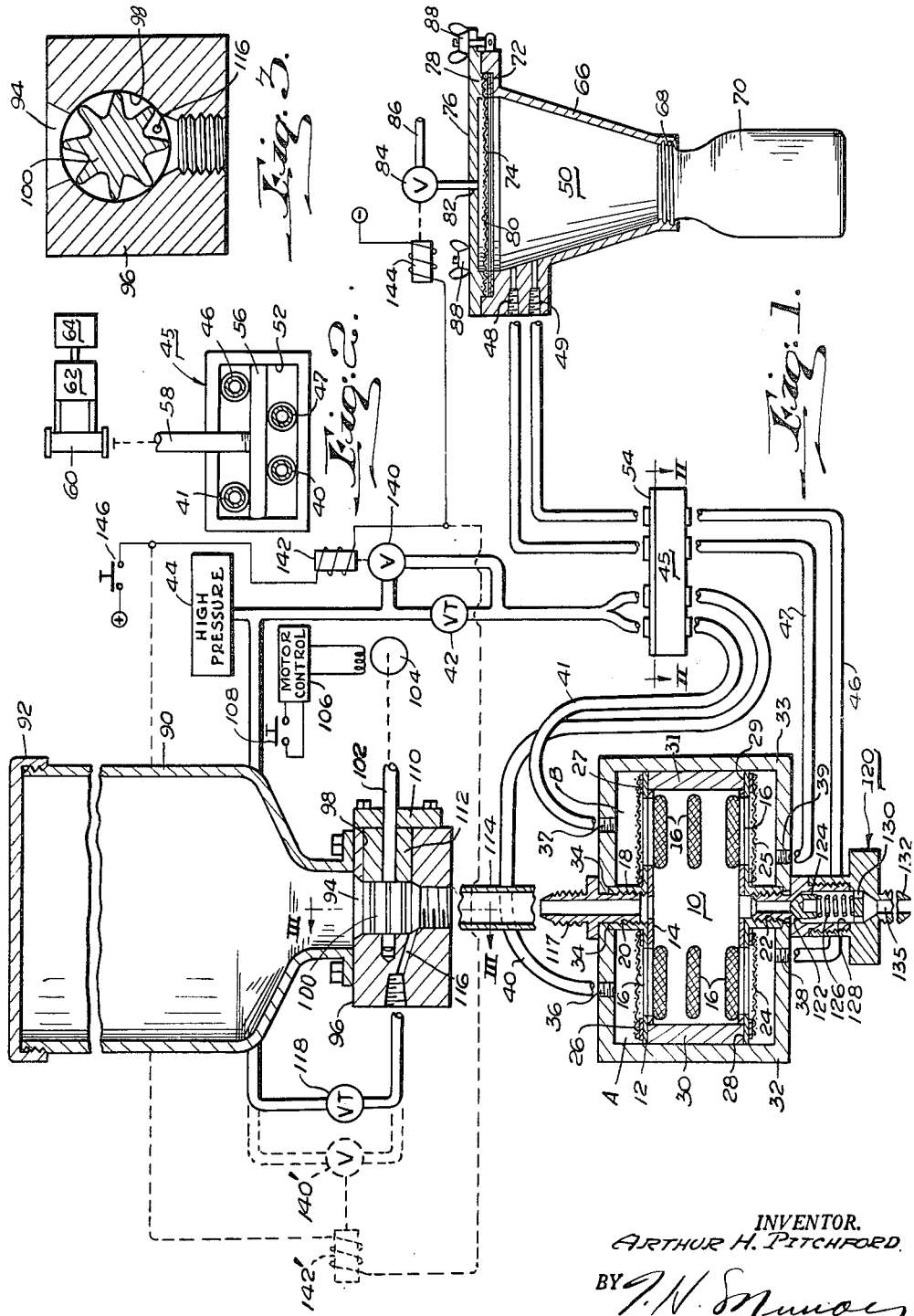

This invention relates to apparatus for segregating particles according to size, and more particularly to apparatus of the type described which is both efficient and rapid in operation.

As is known, particles are commonly separated into different size ranges by a conventional screening process wherein particles of random sizes are brought into contact with a screen of a predetermined mesh size, and the screen and/or particles mechanically agitated to eventually bring all particles into contact with the screen such that those particles at or below the screen mesh size will pass through the screen while those of larger size will not pass through. Existing screening methods of this type, although used extensively, are relatively slow, particularly when it is desired to separate a batch of particles into many different size ranges, which requires a plurality of successive screening steps with screens of different sizes. In addition, in the case of fine particles (i.e., powdered materials), the screen tends to blind or clog and prevents further particles from passing therethrough, the reason being, among other things, that static charges build up in the particles and/or screen which cause the particles to cling to the screen.

As an overall object, the present invention seeks to provide a technique for rapidly segregating particles into different size ranges.

Another object of the invention is to provide apparatus of the type described capable of segregating powdered materials into different size ranges while avoiding the problem of blinding or clogging of screens which is present in conventional particle separating techniques.

Still another object of the invention is to provide apparatus for particle size segregation adapted to continuously and automatically separate particles into different size ranges.

In accordance with one feature of the invention, there is provided a particle receiving chamber, spaced particle separating means in the chamber adapted to permit the passage of particles of a predetermined size, means in the chamber for carrying particles to and away from one and then the other of said spaced separating means, collecting means for receiving particles passing through the particle separating means, and means for discharging the particles of a size too large to pass through the particle separating means out of the chamber after a time has elapsed sufficient to permit all particles of said predetermined size to pass to the collecting means. Preferably, the spaced particle separating means are screens arranged at opposite ends or sides of the chamber. The means for carrying particles to and away from the spaced separating means is a fluid, preferably air, pulsed alternately into the particle receiving chamber through one screen and out through the other. In the pulsing cycle, air goes in through the screen at one end of the chamber, cleaning this screen on the way in; continues through the chamber and blasts the particles against the screen at the opposite end of the chamber; finally passing on to a collector. When particles are blown against a fine screen in this manner, even though the individual particles be the same or smaller than the screen size, the screen will blind or clog very rapidly and prevent any further material from passing therethrough. Consequently, in the present invention the air is alternately pulsed from one end of the particle receiving chamber to the other; and on the second pulse in the cycle, the air flow is reversed, thereby blasting particles against the previously cleaned screen while cleaning the screen against which particles were blasted by the previous pulse. In this manner a clean screen is always presented against which particles are blasted. The collecting means may be a filter paper bag, a settlement chamber, a cyclone type centrifugal collector, an electrostatic precipitator, a screen or the like means for removing the sized particles from the fluid carrier passing through the spaced screens. In order to remove particles which are of a size too large to pass through the screens, a valve is provided in the chamber, and this valve opened after particles of a size to pass through the screens have been removed from the chamber, the remaining particles being blasted through the valve by introducing fluid under relatively high pressure into the chamber. In certain cases, it may be desirable to employ a check valve for this purpose. During the time when the particles are alternately carried to and away from the spaced screens to separate the smaller particles from those of larger size, the check valve will remain closed. After all of the small particles are separated, however, fluid under higher pressure is introduced into the chamber to open the check valve and blow out all of the larger-sized particles to prepare the chamber for a successive batch of particles to be separated.

In accordance with another aspect of the invention, a plurality of particle receiving chambers of the type described above may be connected in series with each chamber discharging through its valve into the next succeeding chamber. By providing screens of larger mesh size in succeeding chambers, the output from each chamber to its associated collecting means will be particles of progressively increasing size. Thus, a batch of particles of random sizes may be separated into smaller batches of discrete size ranges, and this achieved rapidly and efficiently due to the alternate cleaning of the spaced screens in each chamber.

In accordance with still another aspect of the invention, the foregoing procedure may be effected on a continuous production basis with particles being fed into the first chamber from a storage bin, and air blasted into each chamber in succession, starting from the last serially-connected chamber and progressing to the first, whereby the particles of each chamber which do not pass through the spaced screens for that chamber may be automatically, or semi-automatically, transferred to the next chamber through appropriate valve means where particles of a particular size range will be separated from those of larger size.

The above and other objects and features of the invention will become apparent from the following detailed description taken in connection with the accompanying drawings which form a part of this specification, and in which:

FIGURE 1 is a partially broken-away cross-sectional view of the basic particle separating means of the invention comprising a particle-receiving chamber having spaced screens therein together with collecting means for receiving particles passing through the spaced screens;

FIG. 2 is a cross-sectional view taken along line II—II of FIG. 1 illustrating the pinch valve system used in the apparatus of FIG. 1;

Figure 4:
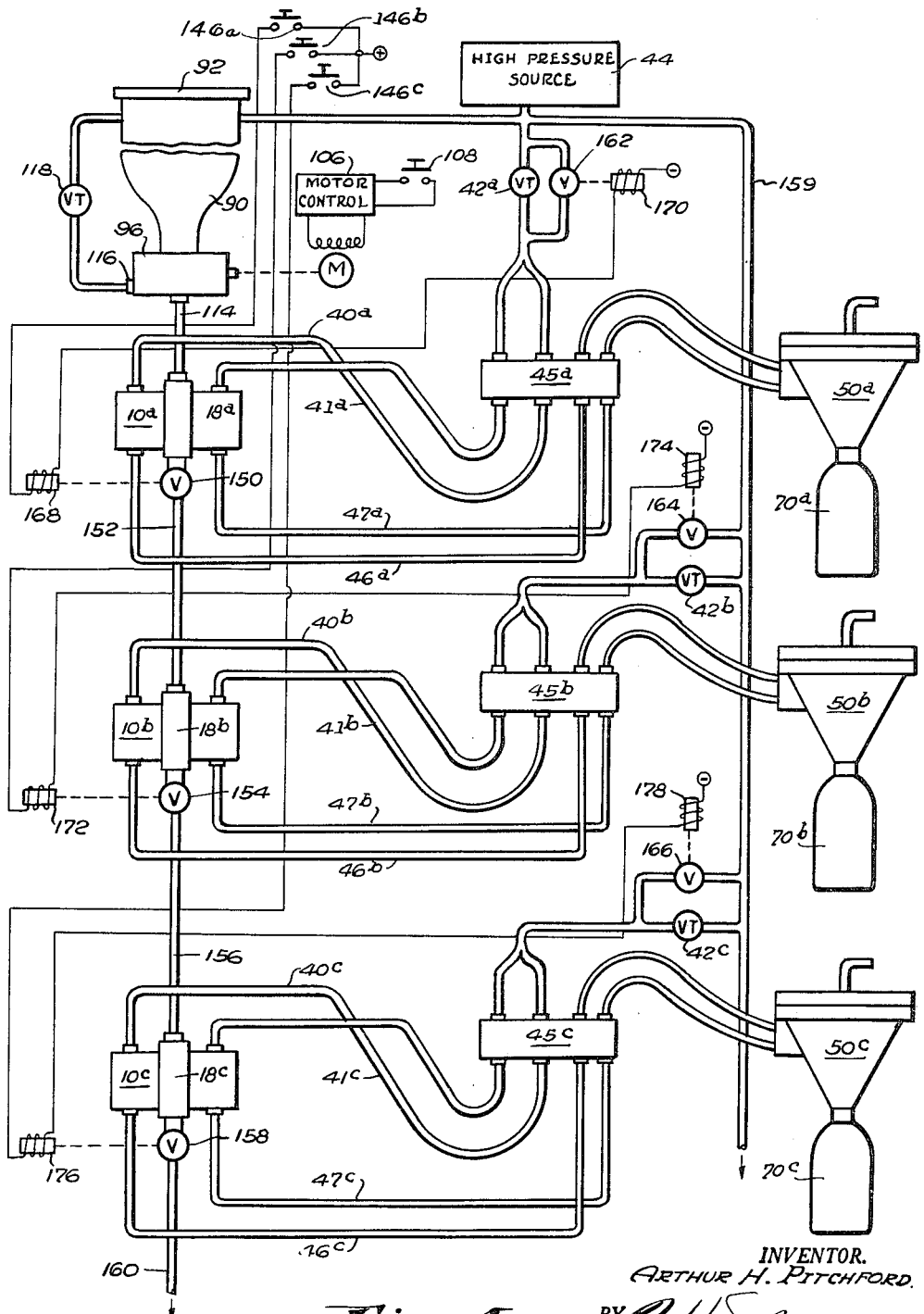

FIG. 3 is a cross-sectional view taken along line III—III of FIG. 1 illustrating the vane-type continuous feeding apparatus of the embodiment of FIG. 1; and FIG. 4 is a schematic illustration of the manner in which a plurality of the particle separating devices of FIG. 1 may be connected in series and operated on an automatic or semi-automatic basis for segregating a batch of particles into a plurality of different size ranges.

Referring now to the drawings, and particularly to

FIGS. 1-3, there is shown a particle-receiving chamber, generally indicated by the reference numeral 10. It comprises a cylindrical vial 12 having a cooperating cylindrical vial insert 14 carried on its inner periphery. As shown, the vial 12 and insert 14 are each provided with registering elongated slots 16 at their opposite ends. Integral with the vial 12 is a circumferentially extending flange 18 having two radially-extending openings 20 and 22 therein. Preferably, both of the openings 20 and 22 will be located at the top of the vial 12; however, they are shown at the top and bottom herein for purposes of explanation. Surrounding the opposite ends of the vial 12 and covering the elongated openings 16 are two cylindrical screens 24 and 25 which are carried on pairs of screen frames 26 and 27 and fitted over the outer peripheral surface of the vial 12 between opposite sides of flange 18 and the ends of the vial 12.

It will be noted that the vial insert 14 has an axial length shorter than that of the vial 12 itself, thereby providing annular seats 28 and 29 which receive disc-shaped end plates 30 and 31. Fitted over the ends of the chamber 10 are cup-shaped housing sections 32 and 33 which have diameters approximating that of the outside diameter of flange 18. The edges of the sections 32 and 33 are provided with annular seats 34, the arrangement being such that the two sections may be held against the flange 18 by clamps or arms, not shown, which are drawn together to hold the housing sections 32 and 33 in abutting relationship with the flange. When the sections 32 and 33 are thus clamped in position, they will also hold the end caps 30 and 31 in position against the opposite ends of the vial insert 14 while forming air manifolds A and B at the opposite ends of the vial.

Extending through the walls of the housing sections 32 and 33 to manifolds A and B are two inlet ports 36 and 37 as well as two outlet ports 38 and 39. Inlet ports 36 and 37 are connected through flexible plastic tubes 40 and 41, respectively, and a throttle valve pressure regulator 42 to a source of fluid under pressure, generally indicated at 44. Between the valve 42 and the inlet ports 36 and 37 is a pulsing mechanism 45, hereinafter described in detail, which serves to alternately admit fluid under pressure into tubes 40 and 41. In a similar manner, the outlet ports 38 and 39 are connected through flexible plastic tubes 46 and 47, respectively, and the pulsing mechanism 44 to the inlet ports 48 and 49 of a filtering or settling chamber 50.

As shown in FIG. 3, the pulsing mechanism 45, in its simplest form, comprises a block having a generally rectangular cavity 52 formed therein and adapted to receive a cover plate 54 (FIG. 1). Reciprocable within the cavity 52 is a bar 56 which is connected through rod 58 to an air cylinder, schematically illustrated at 60. Formed in the cover plate 54 and the bottom of cavity 52 are axially aligned holes through which pass the flexible tubes 40, 41 and 46, 47. It will be noted that the tubes 41 and 46 are on one side of the reciprocating bar 56; whereas the tubes 40 and 47 are on the other side of the bar. The air cylinder 60 is connected through valving, schematically illustrated at 62, to a source of fluid under pressure 64 which may be the same source as source 44 shown in FIG. 1, if desired. The valving mechanism 62 is such as to cause the air cylinder 60 to reciprocate its piston, not shown, back and forth at high speed, thereby reciprocating the bar 56 also. As the bar 56 moves downwardly as shown in FIG. 2, it will pinch and close off tubes 40 and 47. Under these circumstances, fluid under pressure will flow from source 44 through reducing valve 42 and through tube 41 to the air manifold B formed between housing section 33 and the right end of vial 14. From manifold B, the air flows through screen 25 and into the chamber 10 through openings 16, thereby cleaning the screen 25. In this process, the air is forced out of chamber 10 through screen 24 at the opposite end of the chamber, and this air carries with it particles which pass through the screen 24 into manifold A and tube 46 where they are conducted to the settling chamber 50. On the next cycle of air cylinder 60, then, the bar 56 moves upwardly, thereby pinching tubes 41 and 46 and closing them off while permitting air from source 44 to flow through throttling valve 42 and tube 40 into the annular manifold A formed by housing section 32 at the left end of chamber 10. On this half of the cycle, the particles which were previously blasted against the screen 24 are forced back into the chamber 10 while the particles of a size to pass through screen 25 flow through this screen which was previously cleaned on the preceding pulse and into manifold B and tube 47 where they are conducted to the settling chamber 50.

As will be understood, the air in tubes 40 and 41 is pulsed at a very high rate of speed to constantly reverse the air flow through chamber 10 during a particle separating operation to clean one of the screens 24 or 25 while simultaneously blasting particles against the other screen. Due to the high speed of operation, particles of a size to pass through either one of the screens 24 or 25 are removed from chamber 10 very rapidly also, the result being that particles removed from the chamber will be of a size to pass through the screens 24 and 25.

The settling chamber 50, in this case, comprises a funnel-shaped housing 66 having a threaded insert 68 fitted into its lower end. The insert 68, in turn, receives a glass bottle 70 or any other suitable receptacle for receiving particles after they have passed into chamber 50. The upper edge of housing 66 is provided with an annular seat which receives a gasket 72. Positioned on the gasket 72 is a removable disc 74 of filter paper or the like which serves to permit the air under pressure to pass therethrough while retaining the ground material within chamber 50 in order that it may fall into the receptacle 70. The chamber 50 is closed by means of a circular cover 76 provided with an annular flange 78 which carries, at its bottom surface, a screen 80, the purpose of the screen being to give support to the filter paper 74. Provided in the cover 76 is an opening 82 which may, if desired, communicate directly with the atmosphere or with a valve 84 which is normally open to permit the fluid under pressure to pass to the atmosphere through conduit 86. The cover 76 is secured to the housing 66, as shown, by means of a plurality of wing nuts 88.

Although the cup-shaped housings 32 and 33 may be removed from the chamber 10 and the particles to be segregated inserted therein, they may also be fed into the chamber by apparatus including a storage bin 90 having a removable upper cap 92. The lower end of storage bin 90 is funnel-shaped as shown and communicates with an opening 94 in block 96. Intersecting the opening 94 in block 96 is a bore 98 which receives a vane-type feeder 100, possibly best shown in FIG. 3, which is rotatably driven through shaft 102 by means of an electric motor 104 or other suitable source of motive power. As shown, the motor 104 is provided with a motor control circuit 106 and a pushbutton switch 108, the arrangement being such that the pushbutton 108 may be selectively depressed to rotate motor 104. Between the feeder 100 and an end plate 110 is a cylindrical spacer 112. With the arrangement shown, the material to be segregated in bin 90 will be conveyed by feeder 100 to a flexible plastic or other similar tube 114 which leads to a threaded fitting 117, this latter fitting being screwed into opening 20 provided in annular flange 18 as was previously explained.

Under ordinary circumstances, material from bin 90 to be sieved, after being fed into tube 114 by feeder 100, will not readily fall into the chamber 10 due to the back pressure therein and possibly due to the tendency of the material to cling to the sides of the tube 114. Accordingly, means are provided for forcing the material to be screened into the chamber 10, and this means comprises a passageway 116 which serves to conduct air under pressure into the lower half of opening 94 where it will force the material carried by the feeder 100 into the chamber 10. As shown, the passageway 116 is connected through a reducing valve or pressure regulator 118 to the source of high pressure fluid 44, the arrangement being such that the pressure in passageway 116 will be equal to, or slightly greater than, the pressure in tubes 40 and 41 after passing through the throttling valve 42.

Threaded into opening 22 in the annular flange 18 is a check valve assembly, generally indicated at 120, it being understood that the check valve may be replaced by other valve means as will hereinafter be explained. The check valve of the particular embodiment of FIG. 1 includes a valve seat 122 having a check valve member 124 seated thereon by means of a coil spring 126, this coil spring being interposed between the check valve member and the bottom of a cylindrical chamber 128 which contains the check valve member. Drilled into the bottom of the aforesaid cylindrical chamber 128 are a plurality of circumferentially spaced holes 130 which permit fluid under pressure and particles within chamber 10 to pass to a fitting 132 which may, for example, be connected to a tube which leads to a particle-receiving bin.

As was explained above, the opening 22 which receives the check valve assembly 120 will usually be at the top of chamber 10 to prevent particles from collecting above valve member 124 during the separating process when air is pulsed into the chamber through tubes 40 and 41; it being understood that it is shown at the bottom of the chamber herein for purposes of illustration only.

Connected in parallel with the pressure regulator 42 leading to ports 36 and 37 is a second valve 140 which is controlled by means of an electrical solenoid 142. Valve 140 is normally closed but may be opened by energizing the solenoid 142. Connected in series with solenoid 142 is a second solenoid 144 which, when energized, is adapted to close the normally open valve 84 associated with the settling chamber 50, assuming that this latter valve is employed. Obviously, if valve 84 is eliminated, the solenoid 144 may be eliminated also. Both of the solenoids 142 and 144 are controlled by means of a pushbutton switch 146, substantially as shown.

In the operation of the device, the pushbutton 108 will be initially depressed to rotate the motor 104 whereby particles to be segregated will be fed from storage bin 90 into the chamber 10. At the same time, the pulsing mechanism 62 will cause cylinder 60 to oscillate the bar 56 back and forth to alternately open and then close the inlet and outlet tubes 40, 41 and 46, 47 communicating with the chamber 10. The pressure of source 44 may, for example, be about one hundred pounds per square inch. The valves 42 and 118, however, will reduce this pressure to about ten pounds per square inch so that air is alternately pulsed into the chamber 10 through one and then the other of the screens 24 and 25 at about ten pounds per square inch also. In this process, particles of a size to pass through screens 24 and 25 will be collected in settling chamber 50, while particles above this size will be retained within the chamber 10. The spring 126 in check valve assembly 120 is such that the valve will not open under a pressure of ten pounds per square inch for the example given when particles are being separated in the chamber 10.

To clean the chamber 10 of particles of a size too large to pass through the screens 24 and 25, the pushbutton switch 146 is depressed, thereby energizing solenoids 142 and 144. When solenoid 144 is energized, it closes valve 84, thereby closing off the chamber 10 from the atmosphere. At the same time, when solenoid 142 is energized, it will open valve 140 to admit fluid under high pressure (i.e., one-hundred pounds per square inch for the example given) into tube 40 and/or tube 41 where it enters the chamber 10. The high pressure directly from source 44, unlike that through throttle valves 42 and 118, will be sufficient to open the check valve 124.

Thus, the check valve will open and particles of a size too large to pass through screens 24 and 25 will be blown out of chamber 10 and through holes 130 into the fitting 132 where they may be passed to a receiving bin. After all particles have been blown out of the chamber 10, the pushbutton 146 will be released to deenergize the solenoids 142 and 144, thereby opening valve 84 and closing valve 140. To start a new cycle of operation, the pushbutton switch 108 will be depressed to rotate the motor 14 and feed a new batch of particles to be separated into the chamber 10 where the foregoing process is repeated.

Alternatively, the particles of a size too large to pass through screens 24 and 25 may be blown out of chamber 10 by the arrangement shown in dotted outline in FIG. 1. With this arrangement, the valve 140 will be replaced by a normally closed valve 140' connected in shunt with the throttle valve 118. Valve 140' may be opened by means of a solenoid 142' which is substituted for solenoid 142 and connected in series with pushbutton switch 146 and solenoid 144. Thus, when pushbutton switch 146 is now depressed, valve 140' will open and valve 84 will close, but pressure of one-hundred pounds per square inch directly from source 44 will now be forced into chamber 10 through passageway 116 rather than through tubes 40 and 41, the result being the same (i.e., to blow the larger particles out through check valve assembly 120).

Referring now to FIG. 4, three particle separating chambers identified by the numerals 10a, 10b and 10c are shown connected in series with the output from chamber 10a being fed to the input of chamber 10b, and so on. Elements in FIG. 4 which correspond to those of FIGS. 1–3 are identified by like reference numerals, except that those elements associated with chamber 10a have the letter a after each numeral, those associated with chamber 10b have the letter b associated with each numeral, and those associated with chamber 10c have the letter c after each numeral.

Unlike the embodiment of FIG. 1 wherein a check valve is employed at the output of chamber 10, chamber 10a of FIG. 4 is connected through a normally closed solenoid-operated valve 150 and conduit 152 to the inlet of chamber 10b. Likewise, the outlet of chamber 10b is connected through normally closed solenoid-operated valve 154 and conduit 156 to the inlet of chamber 10c; and the outlet of chamber 10c is connected through normally closed solenoid-operated valve 158 to conduit 160 which may, if desired, be connected to the inlet of a succeeding particle-receiving chamber.

High pressure source 44 is connected through conduit 159 and throttle valves or pressure regulators 42a, 42b and 42c to the inlet tubes 40a–40c and 41a–41c of the respective chambers 10a–10c. Connected in shunt with pressure regulators 42a–42c are normally closed solenoid-operated valves 162, 164 and 166, respectively. Solenoids 168 and 170 for valves 150 and 162 are connected in series with pushbutton switch 146a; solenoids 172 and 174 for valves 154 and 164 are connected in series with pushbutton switch 146b; and solenoids 176 and 178 for valves 158 and 166 are connected in series with pushbutton switch 146c. It will be noted that in this particular embodiment, no valves are provided at the outputs of collecting chambers 50a–50c, however they may be provided if found to be desirable. In this later case, the solenoids for the valves on chambers 50a–50c would be connected in series with the other solenoids for the respective chambers, the arrangement being such that the valve for chamber 50a, for example, would close when valves 150 and 162 open. As will be understood, the spaced screens 24a and 25a of chamber 10a (not shown in FIG. 4) will be of a smaller mesh size than those of chamber 10b, while the screens of chamber 10b will be of a smaller mesh size than those in chamber 10c.

In order to effect segregation of the particles in bin 90 into various size ranges, the pushbutton 108 will be depressed to feed particles into chamber 10a. These particles within the chamber 10a, under the influence of the pulsed air from tubes 40a and 41a, will pass particles of a size to pass through the screens in this chamber to the collecting chamber 50a. After this particle-separating step is achieved, pushbutton switch 146a will be depressed to open valves 150 and 162, thereby admitting fluid under high pressure from source 44 into chamber 10a. This forces particles within chamber 10a above the size range of the screens in chamber 10a to pass through valve 150, which is now open, into chamber 10b. Thereafter, the pushbutton switch 146a is released and pushbutton switch 108 will again be depressed to feed more particles to be segregated into chamber 10a. Under these circumstances, particle segregation will occur in both of the chambers 10a and 10b with the particles from chamber 10b passing to collecting chamber 50b being larger than those passing to collecting chamber 50a since, it will be remembered, the screens of chamber 10b are of a larger mesh size than those of chamber 10a. After a predetermined amount of time has elapsed sufficient to permit all particles of a size to pass through the screens in chambers 10a and 10b to be collected in chambers 50a and 50b, the pushbutton switch 146b will first be depressed, thereby opening valves 154 and 164 and admitting fluid under high pressure into chamber 10b to blow particles out of this chamber to chamber 10c. Chamber 10b has now been emptied so that pushbutton switch 146a will now be depressed to open valves 150 and 162 and admit fluid under high pressure into chamber 10a to blow those particles in chamber 10a which have not passed through the screens 24a and 25a into chamber 10b. Finally, the pushbutton switch 108 will be depressed to feed another batch of particles from bin 90 into chamber 10a. All of the chambers 10a, 10b and 10c are now effecting particle segregation, with those particles passing to the collecting chamber 50c being larger than those passing to the collecting chamber 50b, and those passing to collecting chamber 50a being smaller than those passing to chamber 50b.

After all particles of a size to pass through the screens in chambers 10a, 10b and 10c have been collected in their associated chambers 50a–50c, the pushbutton switch 146c will first be depressed to open valves 158 and 166 and thereby admit fluid under high pressure into the chamber 10c. This forces the particles remaining in chamber 10c out through the valve 158 to conduit 160 which may, for example, be connected to a succeeding particle separating chamber. Following the closure of pushbutton switch 146c, pushbutton switch 146b will be closed, followed by closure of pushbutton switch 146a. It can thus be seen that in this manner the larger particles are progressively passed from chamber 10a to chamber 10b to chamber 10c, with each chamber removing particles through its spaced screens which are progressively larger in size.

Athough the invention has been shown in connection with a certain specific embodiment, it will be readily apparent to those skilled in the art that various changes in form and arrangement of parts may be made to suit requirements without departing from the spirit and scope of the invention. In this respect, it will be apparent that the alternative valving arrangement of FIG. 1 may be employed in the system of FIG. 4 and that the successive closure of pushbutton switches 108, 146a, 146b and 146c in FIG. 4 may be effected automatically by apparatus well known to those skilled in the art.

I claim as my invention:

1. Particle separating means comprising a closed particle-receiving chamber, first means for conveying particles into said chamber, second means for conveying particles out of the chamber, check valve means in the second means adapted to open in response to a pressure above a predetermined pressure in the chamber to discharge particles therefrom, spaced openings in the chamber walls, particle separating means covering said openings in the chamber walls and adapted to pass particles of a predetermined size, means for alternately causing fluid to flow into said chamber through one and then the other of said particle separating means at a pressure below said predetermined pressure to alternatively carry particles in the chamber to one and then the other of said particle separating means, collecting means for receiving material passing through the particle separating means, and means for forcing fluid at a pressure above said predetermined pressure into the chamber after particles of a size to pass through the particle separating means have passed to the collecting means whereby particles larger than said predetermined size will be blown out of the chamber through said check valve means.

2. Particle separating means comprising a closed particle-receiving chamber, first conduit means for conveying particles into said chamber, second conduit means for conveying particles out of the chamber, normally closed valve means in the second conduit means, spaced openings in the chamber walls, screens covering said openings in the chamber walls and adapted to pass particles of a predetermined size, means for alternately causing fluid to flow into said chamber through one and then the other of said screens to alternately carry particles in the chamber to one and then the other of said screens, collecting means for receiving material passing through the screens, and single means for opening said valve means and for forcing fluid under pressure into the chamber after particles of a size to pass through the screens have passed to the collecting means whereby particles larger than said predetermined size will be blown out of the chamber through said valve means.

3. Particle separating means comprising a closed particle-receiving chamber, first conduit means for conveying particles into said chamber, second conduit means for conveying particles out of the chamber, check valve means in the second conduit means adapted to open in response to a pressure above a predetermined pressure in the chamber to discharge particles therefrom, spaced openings in the chamber walls, particle separating means covering said openings in the chamber walls, a pair of manifolds disposed over said particle separating means and said openings, means for alternately creating a pressure in one of said manifolds which is higher than that in the other manifold to alternately cause particles in the chamber to move against one and then the other of said particle separating means, the pressure created in said manifolds being below said predetermined pressure, collecting means receiving material passing through said particle separating means, and means for forcing fluid at a pressure above said predetermined pressure into the chamber after particles of a size to pass through the particle separating means have passed to the collecting means whereby particles larger than said predetermined size will be blown out of the chamber through said check valve means.

4. Particle separating means comprising a closed particle-receiving chamber, first conduit means for conveying particles into said chamber, second conduit means for conveying particles out of the chamber, normally closed valve means in the second conduit means, spaced openings in the chamber walls, screen means covering said openings in the chamber walls, a pair of manifolds disposed over said screen means and said openings, fluid inlet and outlet means for each of said manifolds, means acting on said inlet and outlet means to alternately open the inlet means and close the outlet means at one manifold while simultaneously opening the outlet means and closing the inlet means at the other manifold whereby fluid may be pulsed in alternate directions through the screen means and chamber to alternately carry particles against one and then the other of said screens, collecting means for receiving material passing through the screen means, and single means for opening said valve means and for forcing fluid under pressure into the chamber after particles of a size to pass through the screen means have passed to the collecting means whereby particles larger than said predetermined size will be blown out of the chamber through said valve means.

5. Particle separating means comprising a closed particle-receiving chamber, normally closed valve means in the chamber adapted to open to discharge particles therefrom, a storage bin for particles to be separated, means for selectively conveying particles from said storage bin to said chamber, spaced openings in the chamber walls, screens covering said openings in the chamber walls and adapted to pass particles of a predetermined size, means for alternately forcing fluid at a predetermined pressure into said chamber through one and then the other of said screens to alternately carry particles in said chamber to one and then the other of said screens, collecting means receiving material passing through said screens, means for stopping the delivery of particles from said storage bin to said chamber, and single means operative during stoppages in the delivery of said particles to said chamber for opening said valve means and forcing fluid at a pressure above said predetermined pressure into the chamber after particles of a size to pass through the screens have passed to the collecting means whereby particles larger than said predetermined size will be blown out of the chamber through said valve means.

6. Particle separating means comprising a plurality of closed particle-receiving chambers, conduit means connecting said particle-receiving chambers in series whereby particles may pass through the serially-connected chambers in succession, normally closed valve means in the conduit means adapted to open to permit particles to pass through successive ones of said chambers, spaced opening in the chamber walls, particle separating means covering said opening and adapted to pass particles of a predetermined size, means for alternately causing fluid to flow into each chamber through said particle separating means to alternately carry particles in the chamber to one and then the other of said particle separating means, a plurality of collecting devices each of which receives material passing through the particle separating means of an associated one of said chambers, and means for opening said valve means and for forcing fluid under pressure into each chamber after particles of a size to pass through the particle separating means in that chamber have passed to the collecting device for the chamber, the arrangement being such that the latter-mentioned fluid under pressure will force particles which have not passed through the particle separating means of each chamber out of that chamber and into the next successive chamber.

7. Particle separating means comprising a closed particle-receiving chamber, first means for conveying particles into said chamber, second means for conveying particles out of the chamber, normally closed valve means in the second means, spaced openings in the chamber walls, screens covering said openings in the chamber walls and adapted to pass particles of a predetermined size, a first pair of conduits each of which is adapted to convey fluid at a predetermined pressure into said chamber through an associated one of said screens, a second pair of conduits each of which is adapted to carry particles out of said chamber which pass through an associated one of said screens, unitary valve means for alternately opening and then closing one conduit in said first pair associated with one of said screens while reversely closing and then opening the other conduit in said first pair associated with the other of said screens and for simultaneously alternately opening then closing the conduit in said second pair associated with said other of said screens while reversely closing then opening the other conduit in said second pair whereby fluid is pulsed in alternate directions through the screen and chamber to alternately carry particles against one and then the other of said screens, and single means for opening said normally closed valve means and for forcing fluid at a pressure above said predetermined pressure into the chamber after particles of a size to pass through the screens have passed to the collecting means whereby particles larger than said predetermined size will be blown out of the chamber through said valve means.

References Cited in the file of this patent
UNITED STATES PATENTS

| | | |
|---|---|---|
| 339,723 | Winkler | Apr. 13, 1886 |
| 488,067 | Foster | Dec. 13, 1892 |
| 1,497,792 | Perkins | June 17, 1924 |
| 1,528,983 | Montgomery | Mar. 10, 1925 |
| 1,530,193 | Montgomery | Mar. 17, 1925 |
| 2,058,959 | Denning | Oct. 27, 1936 |
| 2,996,183 | Russum | Aug. 15, 1961 |

FOREIGN PATENTS

| | | |
|---|---|---|
| 344,227 | Great Britain | Mar. 5, 1931 |